May 15, 1962     J. E. THOMPSON     3,034,816
AUTOMATIC SANDING DEVICE FOR AUTOMOBILES
Filed March 8, 1961
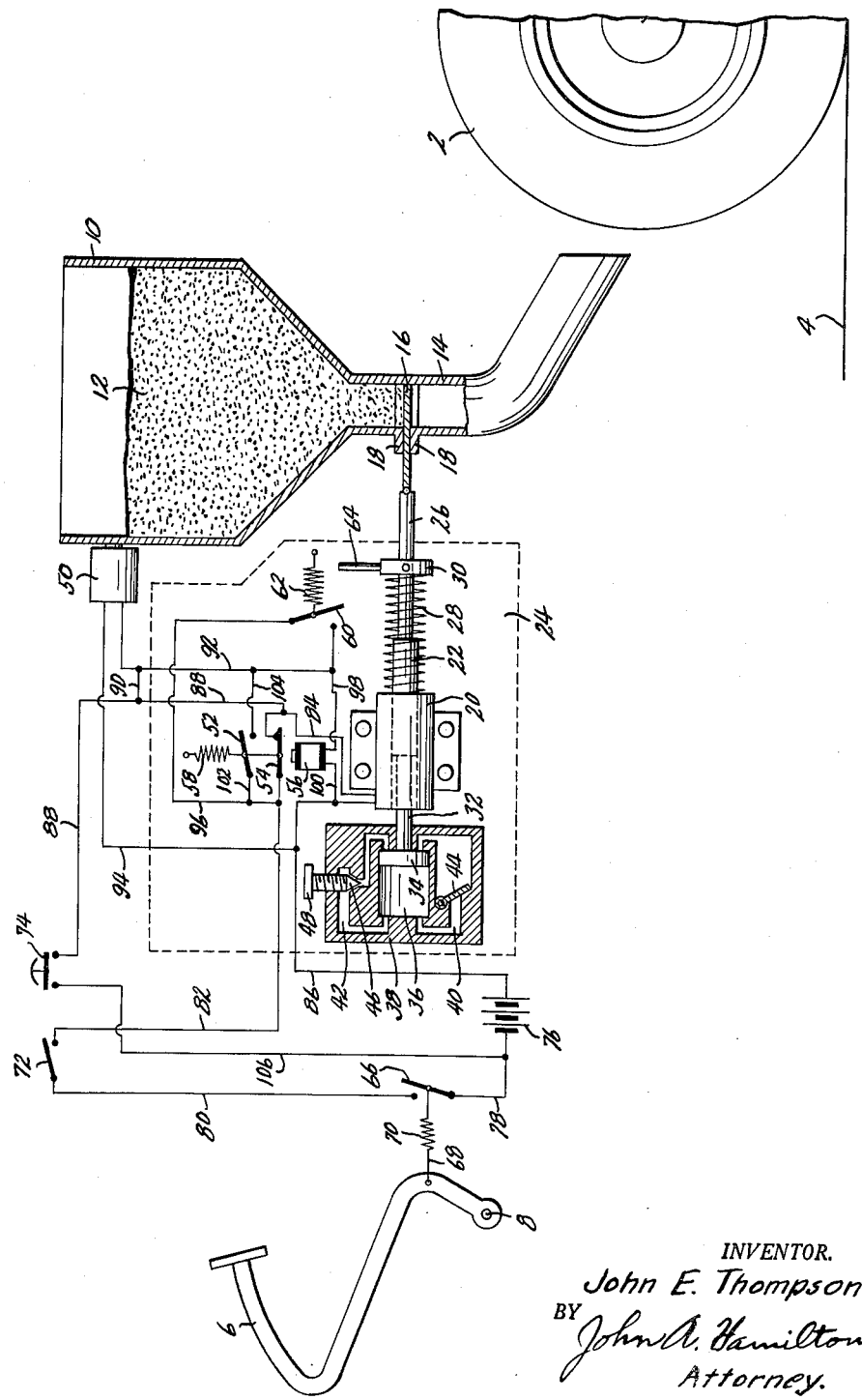
INVENTOR.
John E. Thompson
BY John A. Hamilton
Attorney.

United States Patent Office 3,034,816
Patented May 15, 1962

3,034,816
AUTOMATIC SANDING DEVICE FOR AUTOMOBILES
John E. Thompson, 1832 Benton Blvd., Kansas City, Mo., assignor of forty percent to Leonard Davis, Kansas City, Mo.
Filed Mar. 8, 1961, Ser. No. 94,254
4 Claims. (Cl. 291—15)

This invention relates to new and useful improvements in automobile safety devices, and has particular reference to devices for causing sand or the like to be deposited on the road surface ahead of the vehicle wheels, as an aid to better traction.

An important object of the present invention is the provision of a device of the character described which will deposit sand on the roadway automatically whenever the vehicle brakes are applied, by means of an operative connection with the brake pedal of the vehicle. Periods of brake application on icy or slippery roads are of course the times when traction aids are most needed.

Another object is the provision of a device of the character described which will deliver a measured quantity of sand each time the brake pedal is depressed, and then shut off automatically. This prevents waste of the sand when the brake pedal must be depressed for substantial periods of time, as when waiting for a traffic signal light, but permits a substantially continuous flow of sand if the brake pedal is "pumped."

A still further object is the provision of a device of the character described having a control means operable independently of the brake pedal, in order that sand may be applied to the roadway when the brakes are not in use, as for example when starting on a slippery road or when driving up an icy hill or incline.

Other objects are simplicity and economy of construction, efficiency and dependability of operation, the provision of means insuring free flow of the sand, and the provision of means for adjusting the quantity of sand delivered on each operation of the brake pedal.

With these objects in view, as well as other objects which will appear in the course of the specification, reference will be had to the drawing, which is a partially schematic and partially diagrammatic layout of an automatic sanding apparatus for automobiles embodying the present invention.

Referring to the drawing, the numeral 2 applies to the rear wheel of an automobile, and the numeral 4 applies to the road surface supporting the automobile. The sanding device is shown in connection with only one wheel of the automobile, but it will be understood that the device will ordinarily be adapted to apply sand to road surface 4 in front of at least both of the rear wheels of the vehicle, and also in front of the forward wheels if desired. The numeral 6 designates the foot brake pedal of the automobile, said pedal being pivoted at 8 and operable when moved by foot pressure to the left (as viewed in the drawing) to apply the brakes of the vehicle. The braking system may be entirely conventional and is not shown.

A hopper 10 for containing sand 12 or other suitable anti-skid material is mounted at any suitable position on the vehicle, such as within the baggage compartment thereof. A tubular conduit 14 is interconnected to the bottom of said hopper, and is operable to conduct sand from said hopper and to discharge it onto road surface 4 just forwardly of wheel 2. Branch conduits, not shown, may be positioned to deposit sand on the road surface forwardly of the other wheels of the vehicle. The flow of sand in conduit 14 is controlled by a valve 16 constituting a flat plate slidable in guide-ways 18 to a closed position in which it intersects conduit 14 to prevent the flow of sand therethrough, and to an open position in which it is removed from conduit 14 to permit the flow of sand therethrough. Motive power for opening valve 16 is supplied by a solenoid coil 20 having an armature 22 movable therein, said coil being fixedly mounted on a base plate 24 which it will be understood is mounted on some fixed portion of the automobile. Armature 22 is connected by a rod 26 to valve 16, so that whenever coil 22 is energized, armature 22 will be drawn into said coil (to the left in the drawing) to open valve 16. A compression spring 28 is disposed about rod 26, bearing at one end against coil 20 and at its opposite end against a collar 30 fixed on rod 26, whereby to return valve 16 to its closed position whenever coil 20 is de-energized.

To control the rate at which valve 16 is closed by spring 28, a second rod 32 is attached to armature 22 and extends therefrom oppositely to rod 26. To the outer end of rod 32 is affixed a piston 34 operable in a hollow cylinder 36 formed in a hydraulic housing 38 also affixed to base plate 24, said piston moving to the left as valve 16 is opened and to the right as said valve is closed. The opposite ends of the cylinder are interconnected by a pair of passages 40 and 42 formed in housing 38. Passage 40 is controlled by a check valve 44 which opens to permit free flow of hydraulic fluid from the left to the right end of the cylinder so that piston 34 can move freely to the left to permit valve 16 to open rapidly, but will close to prevent a reverse flow. Passage 42 is controlled by a needle valve 46 to regulate the flow of fluid from the right end to the left end of cylinder 36, and thereby to regulate the speed at which valve 16 is closed by spring 28. Said needle valve may be regulated manually by turning the head 48 thereof.

Attached to hopper 10 is an electrically operated vibrator 50 which may be of any common construction such that when it is energized, it will vibrate the hopper and its contents. Generally, as will presently appear, this vibrator is energized whenever valve 16 is opened, to insure free flow of sand through said valve.

Mounted on base plate 24 is a relay comprising a normally open switch 52, a normally closed switch 54 and an electro-magnetic coil 56. Said switches are held in their normal positions by spring 58, but switch 52 is closed and switch 54 is opened whenever coil 56 is energized. Also mounted on base plate 24 is a switch 60 normally held open by spring 62, but which is closed mechanically by a rod 64 affixed to collar 30 whenever valve 16 approaches its fully open position.

The system includes a switch 66 disposed adjacent brake lever 6 and mechanically interconnected to said pedal, as at 68, so as to be closed whenever said pedal is depressed to apply the brakes. Interconnection 68 includes a tension spring 70 so arranged that while switch 66 will be closed on the initial movement of the pedal, full pedal movement is possible without damage to the switch. The system also includes an on-off switch 72 and a push-button switch 74, both disposed conveniently to the driver of the automobile. The numeral 76 indicates a source of electric power, which may be the usual car battery.

To set the system in operation for sanding the road whenever brake pedal 6 is depressed, the driver closes switch 72. Then, whenever padel 6 is depressed it functions to close switch 66. This closes a circuit from battery 76 through wire 78, switch 66, wire 80, switch 72, wire 82, switch 54 (then closed), wire 84, solenoid coil 20 and wire 86 to the battery, whereby coil 20 is energized to draw armature 22 to the left against the pressure of spring 28 and open valve 16 so that sand will flow from hopper 10 through conduit 14 and be deposited by gravity on the road surface 4 ahead of wheel 2. Free and rapid opening of valve 16 is permitted by the opening of check valve 44 in hydraulic housing 38. Simultaneously with the energizing of coil 20 as just described, a parallel circuit from switch 54 is completed through wires 84, 88, 90 and 92, vibrator 50, and wires 94 and 86 to the battery. This energizes the vibrator, which vibrates the hopper to insure free flow of sand through valve 16.

As valve 16 approaches its fully open position, rod 64 engages and closes switch 60. This completes an operative circuit from wire 82 through wire 96, switch 60, wire 98, coil 56, and wires 100 and 86 to the battery. Coil 56, thus energized, opens switch 54 and closes switch 52. The opening of switch 54 interrupts the circuit of solenoid coil 20, whereupon spring 28 immediately begins to close valve 16, the speed and time of closure being regulated by needle valve 46. The closure of switch 52 completes a holding circuit from wire 82 through wires 96 and 102, switch 52, wires 104, 92 and 98, coil 56, and wires 100 and 86 to the battery, so that switch 54 is held open, and switch 52 held closed, until brake pedal 6 is released to allow switch 66 to open. The closure of switch 52 also establishes a circuit from said switch through wires 104 and 92, vibrator 50, and wires 94 and 86 to the battery, whereby the vibrator is also maintained in operation until brake pedal 6 is released and switch 66 allowed to open.

Thus each time the brake pedal is depressed sand will be released and deposited on the roadway for a length of time which may be closely regulated by needle valve 46, and then will be shut off automatically. Thus sand will not be deposited continuously as long as the brake pedal is depressed. This provision prevents the waste of sand when the brake pedal must be kept depressed for substantial periods of time, as when waiting for a signal light to change. Nevertheless, if a continuous flow is desired, as when it is necessary to slow gradually over a substantial distance, such continuous flow may be obtained by "pumping" the brakes or applying them intermittently. Each time the pedal is released, relay coil 56 is de-energized and allows switch 54 to close, so that solenoid coil 20 will again be energized when the pedal is again depressed. In any event such intermittent application of brakes is recommended procedure whenever slowing an automobile on a slippery surface. It is considered to be an advantage of my system that it encourages this safety practice.

Sanding of the road surface may also be desirable during periods when not braking and when operation of the brake pedal to actuate the sanding apparatus would not be possible or practical, as for example when starting a car in motion on a slippery surface, or to obtain traction to climb a slippery incline, or at other times. Push button 74 is provided for this purpose. Whenever said push button is depressed, it completes a circuit from battery 76 through wires 78 and 106, push button 74, wires 88 and 84, solenoid coil 20, and wire 86 to the battery, whereby to energize the solenoid to open valve 16, and a parallel circuit from push button 74 through wires 88, 90 and 92, vibrator 50, and wires 94 and 86 to the battery, whereby to energize the vibrator. Valve 16 will remain open, and vibrator 50 will be energized, as long as push button 74 is depressed.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An automatic sanding apparatus for automobiles comprising a sand reservoir adapted to be mounted on an automobile, a conduit interconnected to said reservoir for depositing sand from said reservoir on the surface of the roadway supporting said automobile, a valve controlling the flow of sand in said conduit, means biasing said valve yieldably toward its closed position, valve opening means operable when actuated to open said valve, actuating means interconnected to the brake pedal of said automobile and operable when said pedal is depressed to actuate said valve opening means, cut-off means operable when actuated to render said valve opening means inoperative, trip means interconnected to said valve and operable when said valve is fully open to actuate said cut-off means, whereupon said valve is closed by said biasing means, and holding means interconnected to said actuating means and said cut-off means and operable when said brake pedal is depressed and said cut-off means is actuated to maintain said cut-off means in actuated condition, whereby the apparatus may be re-cycled only by releasing said brake pedal.

2. An automatic sanding apparatus for automobiles comprising a sand reservoir adapted to be mounted on an automobile, a conduit interconnected to said reservoir for depositing sand from said reservoir on the surface of the roadway supporting said automobile, a valve controlling the flow of sand in said conduit, means biasing said valve yieldably toward its closed position, electrical valve opening means operable when energized to open said valve, an operable electrical circuit including said valve opening means and a switch, and electrical means in said circuit operable when said circuit is energized to render said valve opening means inoperable after said valve is fully opened, whereupon said valve is closed by said biasing means.

3. An automatic sanding apparatus for automobiles comprising a sand reservoir adapted to be mounted on an automobile, a conduit interconnected to said reservoir for depositing sand from said reservoir on the surface of the roadway supporting said automobile, a valve controlling the flow of sand in said conduit, means biasing said valve yieldably toward its closed position, electrical valve opening means operable when energized to open said valve, an operable electrical circuit including said valve opening means and a switch, electrical means in said circuit operable when said circuit is energized to render said valve opening means inoperable after said valve is fully opened, whereupon said valve is closed by said biasing means, and adjustable means for regulating the time required for said valve to close.

4. An automatic sanding apparatus for automobiles comprising a sand reservoir adapted to be mounted on an automobile, a conduit interconnected to said reservoir for depositing sand from said reservoir on the surface of the roadway supporting said automobile, a valve controlling the flow of sand in said conduit, means biasing said valve yieldably toward its closed position, electrical valve opening means operable when energized to open said valve, an operable electrical circuit including said valve opening means, a normally open first switch and a normally closed second switch, electrical switch operating means operable when energized to open said second switch, a second electrical circuit including said first switch, said switch operating means, and a normally open third switch, means connected to and movable with said valve to close said third switch when said valve approaches its open position, a conductor by-passing said third switch, and a normally open fourth switch in said by-pass conductor, said switch operating means being operable when energized to close said fourth switch.

References Cited in the file of this patent

UNITED STATES PATENTS

| | | |
|---|---|---|
| 1,117,894 | Orbin | Nov. 17, 1914 |
| 1,431,307 | Humphrey | Oct. 10, 1922 |
| 1,784,832 | Florian | Dec. 16, 1930 |